US012558209B2

(12) United States Patent
Fujiwara et al.

(10) Patent No.: US 12,558,209 B2
(45) Date of Patent: Feb. 24, 2026

(54) TEST FISH HANDLING EQUIPMENT AND TEST FISH HANDLING METHOD USING TEST FISH HANDLING EQUIPMENT THEREOF

(71) Applicant: KOBELCO ECO-SOLUTIONS CO., LTD., Kobe (JP)

(72) Inventors: Naomi Fujiwara, Kobe (JP); Shiro Toyohisa, Kobe (JP); Shinichi Nonaka, Kobe (JP); Miki Nishi, Kobe (JP); Yukiko Yanoue, Kobe (JP); Masao Tomiki, Kobe (JP); Yukiko Nakajima, Kobe (JP); Yukihiro Niboshi, Kobe (JP)

(73) Assignee: KOBELCO ECO-SOLUTIONS CO., LTD., Kobe (JP)

( * ) Notice: Subject to any disclaimer, the term of this patent is extended or adjusted under 35 U.S.C. 154(b) by 191 days.

(21) Appl. No.: 18/284,576

(22) PCT Filed: Mar. 25, 2022

(86) PCT No.: PCT/JP2022/014556
§ 371 (c)(1),
(2) Date: Sep. 28, 2023

(87) PCT Pub. No.: WO2022/210397
PCT Pub. Date: Oct. 6, 2022

(65) Prior Publication Data
US 2024/0156066 A1      May 16, 2024

(30) Foreign Application Priority Data
Mar. 29, 2021      (JP) ................................. 2021-055155

(51) Int. Cl.
*A01K 61/00* (2017.01)
*A01K 63/00* (2017.01)
*A61D 3/00* (2006.01)

(52) U.S. Cl.
CPC ................ *A61D 3/00* (2013.01); *A01K 63/00* (2013.01)

(58) Field of Classification Search
CPC ....... A61D 2003/003; A61D 2003/006; G01G 17/00
See application file for complete search history.

(56) References Cited

U.S. PATENT DOCUMENTS 5,103,767 A      4/1992  Haugland et al.
6,145,476 A  *  11/2000  Tempel .................. A01K 63/02
119/215

(Continued)

FOREIGN PATENT DOCUMENTS

EP      0418240 B1      1/1993
JP      372201 A      3/1991

(Continued)

OTHER PUBLICATIONS

International Search Report issued in PCT/JP2022/014556 on Jun. 14, 2022.

(Continued)

*Primary Examiner* — Joshua J Michener
*Assistant Examiner* — Henry Hooper Mudd
(74) *Attorney, Agent, or Firm* — The Webb Law Firm

(57) ABSTRACT

Provided is test fish handling equipment capable of reliably holding a test fish by preventing damage to the test fish, and a test fish handling method using the test fish handling equipment. The test fish handling equipment includes a holder for holding the test fish, and guiding means for guiding the test fish to the holder together with water. The (Continued)

holder includes a posture maintaining groove for maintaining the test fish in a predetermined posture. At least an inner surface of the posture maintaining groove is made of a flexible material. One end of the guiding means includes a supply port, and the other end includes a discharge port.

19 Claims, 15 Drawing Sheets

(56)                    References Cited

U.S. PATENT DOCUMENTS

| | | | | |
|---|---|---|---|---|
| 6,662,488 | B1 * | 12/2003 | Heimbrock | ............ A01K 97/20 |
| | | | | 43/55 |
| 10,117,441 | B2 * | 11/2018 | Goodrick | ............... A01K 61/00 |
| 10,412,928 | B1 * | 9/2019 | Qamar | ..................... A01K 1/06 |
| 2006/0081192 | A1 | 4/2006 | Massey et al. | |

| | | | | |
|---|---|---|---|---|
| 2018/0325405 | A1 | 11/2018 | Kim | |
| 2019/0167772 | A1 * | 6/2019 | de la Fuente Garcia | ................... |
| | | | | A61K 39/00 |
| 2019/0320624 | A1 * | 10/2019 | Becker | ................... A01K 61/13 |
| 2021/0267172 | A1 * | 9/2021 | Huber | ................... A01K 29/00 |

FOREIGN PATENT DOCUMENTS

| | | | | | |
|---|---|---|---|---|---|
| JP | 4179420 | A | | 6/1992 | |
| JP | H04179420 | A | * | 6/1992 | ............ A01K 61/00 |
| JP | H072322 | U | | 1/1995 | |
| JP | 305118 | U | | 8/1998 | |
| JP | 4673899 | B2 | | 4/2011 | |

OTHER PUBLICATIONS

Extended European Search Report issued in EP22780610.6 on Jan. 14, 2025.

* cited by examiner

TEST FISH HANDLING EQUIPMENT AND TEST FISH HANDLING METHOD USING TEST FISH HANDLING EQUIPMENT THEREOF

CROSS REFERENCE TO RELATED APPLICATIONS

This application is the United States national phase of International Patent Application No. PCT/JP2022/014556 filed Mar. 25, 2022, and claims priority to Japanese Patent Application No. 2021-055155 filed Mar. 29, 2021, the disclosures of which are hereby incorporated by reference in their entireties.

BACKGROUND OF THE INVENTION

Field of the Invention

The present invention relates to test fish handling equipment (fish holding apparatus) for holding a test fish used for various biological observations or biological experiments, and further relates to a test fish handling method (administration method for a fish) for performing predetermined handling on the test fish by using the test fish handling equipment.

Description of Related Art

As a method for administering a test substance to the test fish, a method for mixing the test substance with food and supplying the food mixed with the test substance to a water tank to feed the test fish, and a method for dissolving a test substance in breeding water so that the test substance is absorbed from a gill (for example, fish acute toxicity test conforming to the OECD test guideline 203) are known.

However, according to the method for administering the test substance in which the food containing the test substance is supplied to the water tank, it is difficult to handle a liquid test substance, and furthermore, the food remains uneaten, thereby causing a problem in that it is not possible to accurately recognize the amount of the test substance taken by the test fish. In addition, according to these administration methods, conditions are different from those of animal experiments for mice which adopt oral administration methods for directly administering the test substance into a digestive organ. Therefore, there is a problem in that it is not possible to properly compare the administration methods with the animal experiments.

In this regard, it is desirable to adopt an oral administration method for directly administering the test substance to the digestive organ of the test fish as well.

In recent years, a zebrafish has attracted a great deal of attention as an experimental animal. In the animal experiments using the test fish such as the zebrafish, for example, when the test fish is held during oral administration, an important issue is to minimize damage to the test fish, that is, to hold the test fish as gently as possible without causing any damage to a body surface and without causing any symptom of a burn.

Therefore, in the related art, a fish holder has been proposed in which a synthetic resin plate is bent into a U-shape and a flexible material such as sponge and nonwoven fabric is affixed to an inner surface side for holding the test fish (for example, refer to Japanese Registered Utility Model No. 3051118).

According to the fish holder disclosed in Japanese Registered Utility Model No. 3051118, when the test fish is held during the oral administration, it is possible to gently hold the test fish with a flexible material. However, for example, when the test fish violently acts while the test fish is held, the test fish is inevitably held with a strong force, and thus, there is a high possibility that the test fish may be damaged in some way.

In addition, in order to prevent the test fish from violently acting, it is conceivable to hold the test fish by performing an anesthesia on the test fish. In this case, it is unclear whether an experimental result shows that the test fish is affected by the test substance or by the anesthesia. Furthermore, in a case of an experiment in which the test substance is repeatedly administered, when the anesthesia is performed each time the test substance is administered, the test fish is repeatedly affected by the anesthesia. Therefore, it is not possible to make an experiment in which the test substance is repeatedly administered.

Furthermore, although there exists the fish holder for holding the test fish, in the related art, no special devices or solutions for a process of holding the test fish do not exist. Therefore, in actual circumstances in the related art, the test fish is scooped with a net, and the scooped test fish is held by the fish holder as it is. Accordingly, there is a high possibility that the test fish may be considerably damaged during a process of holding the test fish with the fish holder.

SUMMARY OF INVENTION

The present invention has focused on this problem in the related art, and an object thereof is to provide test fish handling equipment which can prevent damage to the test fish as much as possible and can reliably hold the test fish in a predetermined posture, and further to provide a test fish handling method using the test fish handling equipment.

Solution to Problem

A first characteristic configuration of test fish handling equipment according to the present invention includes a holder for holding a test fish to which a test substance is administered as a predetermined handling.

The holder includes a posture maintaining groove for maintaining the test fish supplied together with water in a predetermined posture, and at least an inner surface of the posture maintaining groove is made of a flexible material.

According to the present configuration, the holder for holding the test fish includes the posture maintaining groove for maintaining the test fish in a predetermined posture. Therefore, the test fish is held in a state where the test fish is located inside the posture maintaining groove. At least the inner surface of the posture maintaining groove is made of the flexible material. Therefore, the test fish can be gently held by the flexible inner surface of the posture maintaining groove. In addition, even when the test fish tries to violently act, the test fish is less likely to violently act since the test fish is located inside the posture maintaining groove. As a result, it is possible to prevent damage to the test fish.

In addition, the test fish can be held in a stabilized state while the test fish is moisturized in the holder. Therefore, while damage to the test fish can be greatly prevented, a predetermined handling can be repeatedly performed on the test fish for oral administration or parenteral administration without any anesthesia.

In a second characteristic configuration of the test fish handling equipment according to the present invention, the holder is made of a flexible, water-permeable, and water-retentive material.

According to the present configuration, the material forming the holder has not only flexibility but also water permeability. Therefore, when the test fish is discharged to the posture maintaining groove together with the water, only the test fish remains in the posture maintaining groove within a relatively short time, thereby contributing to reduced damage to the test fish. Furthermore, in addition to the water permeability, the material also has water retention. Therefore, in a state where the test fish is maintained inside the posture maintaining groove, the posture maintaining groove is in a proper water-retentive state, and thus, it is also possible to reduce damage during that time.

The whole holder is made of a material having this performance, for example, a sponge. Therefore, it is easy and inexpensive to manufacture the holder, compared to a case of forming the holder by affixing the sponge to the inner surface of the posture maintaining groove.

In a third characteristic configuration of the test fish handling equipment according to the present invention, the posture maintaining groove is tapered toward a front end side, and is inclined downward toward the front end side.

According to the present configuration, the posture maintaining groove is tapered toward the front end side. Therefore, the test fish discharged to the posture maintaining groove together with the water is guided to be gradually close to a predetermined posture as the posture maintaining groove is directed toward the front end side.

As a result, the test fish is moved toward the front end side along a flow of the water due to its habit, is gradually pinched by the inner surface of the posture maintaining groove, and is maintained in a predetermined posture. Therefore, damage can be effectively prevented during that time.

In a fourth characteristic configuration of the test fish handling equipment according to the present invention, the posture maintaining groove includes an upper groove portion that opens upward and a lower groove portion that continues downward and is wider than the upper groove portion.

In a fifth characteristic configuration of the test fish handling equipment according to the present invention, the posture maintaining groove is formed with the same width from a front end side to a rear end side.

According to the present configuration, the test fish discharged together with the water to the upper groove portion that opens upward in the posture maintaining groove is smoothly received by the upper groove portion while a posture thereof is maintained, and the test fish is smoothly guided to the lower groove portion formed below the upper groove portion and wider than the upper groove portion. In this manner, the test fish can be held by the lower groove portion with less burden.

In a sixth characteristic configuration of the test fish handling equipment according to the present invention, a depth of the posture maintaining groove is set to be greater than a height of the test fish held by the posture maintaining groove.

According to the present configuration, the whole test fish in a height direction is accommodated in the posture maintaining groove. Therefore, the test fish is held in a more stabilized state, and damage to the test fish can be more greatly prevented.

In a seventh characteristic configuration of the test fish handling equipment according to the present invention, the holder includes a rear end side holding portion and a front end side holding portion which bisect the posture maintaining groove in a longitudinal direction, and both holding portions are separable.

According to the present configuration, the holder includes the rear end side holding portion and the front end side holding portion which bisect the posture maintaining groove in the longitudinal direction, and both holding portions are separable. Therefore, a horizontal width of the posture maintaining groove can be appropriately set. For example, the horizontal width in the front end side end portion of the rear end side holding portion is set to the horizontal width in which only a mouth or a head of the test fish protrudes to the front end side from the rear end side holding portion. In this manner, the mouth or the head of the test fish can be easily and reliably observed by holding the test fish in the posture maintaining groove of the rear end side holding portion.

In addition, the horizontal width in the rear end side end portion of the front end side holding portion is set to the horizontal width in which only a caudal fin of the test fish protrudes to the rear end side from the front end side holding portion. In this manner, the caudal fin of the test fish can be easily and reliably observed by holding the test fish in the posture maintaining groove of the front end side holding portion.

In a eighth characteristic configuration of the test fish handling equipment according to the present invention, the holder includes a front holding portion, an intermediate holding portion, and a rear holding portion which are aligned along the longitudinal direction of the posture maintaining groove in a state where the intermediate holding portion is located between the front holding portion and the rear holding portion. The three holding portions are separable. The posture maintaining groove is provided only in the intermediate holding portion of the front holding portion and the intermediate holding portion so that a front end of the posture maintaining groove is located at a boundary between the front holding portion and the intermediate holding portion, and is tapered toward the front end side in a plan view.

According to the present configuration, the front end of the posture maintaining groove is located at the boundary between the front holding portion and the intermediate holding portion. Therefore, the test fish moved to the front end side along a flow of the water in the posture maintaining groove can be received by the front holding portion. The front holding portion and the intermediate holding portion are separated in a state where the test fish is received in this way. In this manner, when the head of the test fish is present on the front end side, the mouth or the head of the test fish can be observed from the front end of the posture maintaining groove. Therefore, the mouth or the head of the test fish can be easily and reliably observed. Furthermore, a length of the intermediate holding portion is set to be equal to a body length of the test fish, and the intermediate holding portion and the rear holding portion are separated. In this manner, even when the head of the test fish is present on the rear end side, the mouth or the head of the test fish can be observed from the rear end of the posture maintaining groove. In addition, since the rear holding portion is present, the guiding means is easily positioned with respect to the intermediate holding portion by placing the guiding means on the rear holding portion.

An ninth characteristic configuration of the test fish handling equipment according to the present invention includes guiding means for guiding the test fish to the holder together with water.

One end of the guiding means includes a supply port through which the test fish is supplied together with water, and the other end includes a discharge port through which the test fish is discharged to the posture maintaining groove together with the water.

According to the present configuration, the guiding means for guiding the test fish to the holder together with the water is provided. One end of the guiding means includes the supply port through which the test fish is supplied together with the water, and the other end includes the discharge port through which the test fish is discharged to the posture maintaining groove together with water. Therefore, the test fish flows to the holder side together with the water, and enters the inside of the posture maintaining groove by simply supplying the test fish together with the water from the supply port of the guiding means. Accordingly, even during a process up to the posture maintaining groove, damage to the test fish can be greatly prevented.

In a tenth characteristic configuration of the test fish handling equipment according to the present invention, the guiding means includes a pipe member, one end thereof having the supply port and the other end having the discharge port.

A pipe-shaped discharge portion disposed above and adjacent to the posture maintaining groove is connected to the discharge port. The discharge portion includes a slit facing the posture maintaining groove along the groove. The test fish is discharged from the slit to the posture maintaining groove in a predetermined posture together with water.

According to the present configuration, the pipe-shaped discharge portion disposed above and adjacent to the posture maintaining groove and connected to the discharge port includes the slit facing the posture maintaining groove along the groove. The test fish is discharged from the slit to the posture maintaining groove together with the water in a predetermined posture. Therefore, the water and the test fish are smoothly and reliably transferred from the discharge port to the posture maintaining groove, and damage to the test fish is prevented during that time.

A eleventh characteristic configuration of the test fish handling equipment according to the present invention includes a first water tank that accommodates the test fish before being supplied to the supply port, and a second water tank that accommodates the test fish released from holding of the holder.

According to the present configuration, the test fish accommodated in the first water tank can be fetched together with the water, and can be immediately supplied to the supply port of the guiding means. In addition, the test fish released from the holding of the holder can be immediately accommodated in the second water tank. Therefore, it is possible to reduce a burden associated with transporting the test fish.

An twelfth characteristic configuration of the test fish handling equipment according to the present invention includes guiding means for guiding a test fish to which a test substance is administered as a predetermined handling is performed, to a predetermined handling portion together with water.

One end of the guiding means includes a supply port through which the test fish is supplied together with the water, and the other end includes a discharge port through which the test fish is discharged to the handling portion together with the water.

According to the present configuration, the guiding means for guiding the test fish to the holder together with the water is provided. One end of the guiding means includes the supply port through which the test fish is supplied together with the water, and the other end includes the discharge port through which the test fish is discharged to the handling portion of the posture maintaining groove together with the water. Therefore, the test fish flows to the holder side together with the water, and enters the handling portion by simply supplying the test fish together with the water from the supply port of the guiding means. Accordingly, even during a process up to the handling portion, damage to the test fish can be greatly prevented.

In a thirteenth characteristic configuration of the test fish handling equipment according to the present invention, the guiding means includes a pipe member, one end thereof having the supply port and the other end having the discharge port.

According to the present configuration, the guiding means includes the pipe member, one end having the supply port and the other end having the discharge port. Therefore, for example, compared to a configuration including a gutter-shaped member having an open upper surface, there is no possibility that the test fish may jump out while the test fish is guided. Not only is the test fish reliably guided, but also is a route up to the handling portion more freely set.

A fourteenth characteristic configuration of the test fish handling equipment according to the present invention includes water flow forming means for forming a water flow inside the pipe member by supplying the water to the supply port.

According to the present configuration, the water is supplied to the supply port of the guiding means by the water flow forming means, and the water flow is formed inside the pipe member connected to the supply port. Therefore, while a burden on the test fish can be reduced as much as possible, the test fish supplied to the supply port can be guided to the discharge port by riding on the water flow formed inside the pipe member, and can be discharged to the handling portion from the discharge port.

In a fifteenth characteristic configuration of the test fish handling equipment according to the present invention, a funnel-shaped funnel portion for guiding the test fish together with the water to the supply port is connected to the supply port.

According to the present configuration, the funnel-shaped funnel portion for guiding the test fish together with the water is connected to the supply port. Therefore, the water and the test fish easily flow into the supply port by using the funnel-shaped funnel portion.

A sixteenth characteristic configuration of the test fish handling equipment according to the present invention includes a water receiver in which the handling portion is installed and which receives the water discharged from the discharge port.

According to the present configuration, since the water receiver is provided, even when the test fish discharged from the discharge port is dropped from the handling portion, the dropped test fish can be accommodated in the water stored in the water receiver without any burden. Furthermore, when water level maintaining means for maintaining a water storage level of the water receiver at a predetermined set water level while draining the water stored in the water receiver is provided, a wet state of the handling portion immersed in the water stored in the water receiver can be maintained in a constant state, and a moisturized state of the test fish held by the handling portion can be maintained in a proper state.

A first characteristic configuration of a test fish handling method according to the present invention includes using the test fish handling equipment having any one of the first to tenth characteristic configurations, and performing a predetermined handling on the test fish held by the holder.

According to the present configuration, the test fish handling equipment having the first or second characteristic configurations is used. Therefore, when the test fish is held, damage to the test fish can be prevented as much as possible, and the test fish can be reliably held in a predetermined posture. In this state, a predetermined handling is performed on the test fish held by the holder. Therefore, the handling can be easily and reliably performed.

In addition, the test fish can be held in a stabilized state while the test fish is moisturized in the holder. Therefore, while damage to the test fish can be greatly prevented, a predetermined handling can be repeatedly performed on the test fish for oral administration or parenteral administration without any anesthesia.

In a second characteristic configuration of the test fish handling method according to the present invention, as the predetermined handling, oral administration is performed to directly and orally administer a test substance to the test fish through an oral tube inserted into an oral cavity of the test fish maintained in a predetermined posture by the posture maintaining groove of the holder.

According to the present configuration, the test substance enclosed in a syringe is directly and orally administered to the test fish through the oral tube inserted into the oral cavity of the test fish in a state where the test fish is reliably held in a predetermined posture by the holder. Therefore, oral administration can be easily and reliably performed.

Direct oral administration includes performing oral administration to directly administer the test substance to the oral cavity of the test fish, unlike a method for mixing the test substance with the food and supplying the food mixed with the test substance to the water tank to feed the test fish as in the related art, and a method for dissolving the test substance in breeding water so that the test substance is absorbed from a gill.

In addition, as the direct oral administration of the test substance to the test fish, it is conceivable to adopt a method for performing the direct oral administration by using a syringe including an oral tube such as an oral probe in a state where the test fish is under a general anesthesia. However, according to this method, even when an attempt is made to evaluate an effect of the test substance to the test fish, it is difficult to determine whether the effect is caused by stress of the test fish subjected to the anesthesia or whether the effect is caused by the test substance. Furthermore, when the attempt is made to evaluate the effect by administering a small amount of the test substance to the test fish every day, according to a method for anesthetizing the test fish in the related art, the test fish is anesthetized every day. Accordingly, the test fish is under great stress, and it is difficult to use an evaluation test in this way.

Therefore, in the method for handling the test fish according to the present invention, the direct oral administration can be performed without anesthetizing the test fish in a state where damage is prevented as much as possible. Accordingly, it is easy to evaluate the effect of the test substance on the test fish, and furthermore, it is possible to conduct an experiment for evaluating the effect by administering a small amount of the test substance to the test fish every day.

In a third characteristic configuration of the test fish handling method according to the present invention, as the predetermined handling, parenteral administration is performed to administer the test substance to the test fish by injection into the test fish maintained in a predetermined posture by the posture maintaining groove of the holder.

According to the present configuration, the parenteral administration is performed by administering the test substance to the test fish by the injection into the test fish in a state where the test fish is reliably held in a predetermined posture by the holder. Therefore, the parenteral administration can be easily and reliably performed.

For example, the parenteral administration includes intra-peritoneal administration or intravenous administration using the injection. In addition, in order to perform the parenteral administration in this way, when the test fish is rotated around a front-rear axis by the holder so that an abdomen of the test fish is exposed to an upper opening of the posture maintaining groove, the injection can be easily performed into the abdomen of the test fish.

BRIEF DESCRIPTION OF THE DRAWINGS

The terms Fig., Figs., Figure, and Figures are used interchangeably in the specification to refer to the corresponding figures in the drawings.

DESCRIPTION OF THE INVENTION

Embodiments of test fish handling equipment and a test fish handling method using the test fish handling equipment according to the present invention will be described with reference to the drawings.

Figure 1:
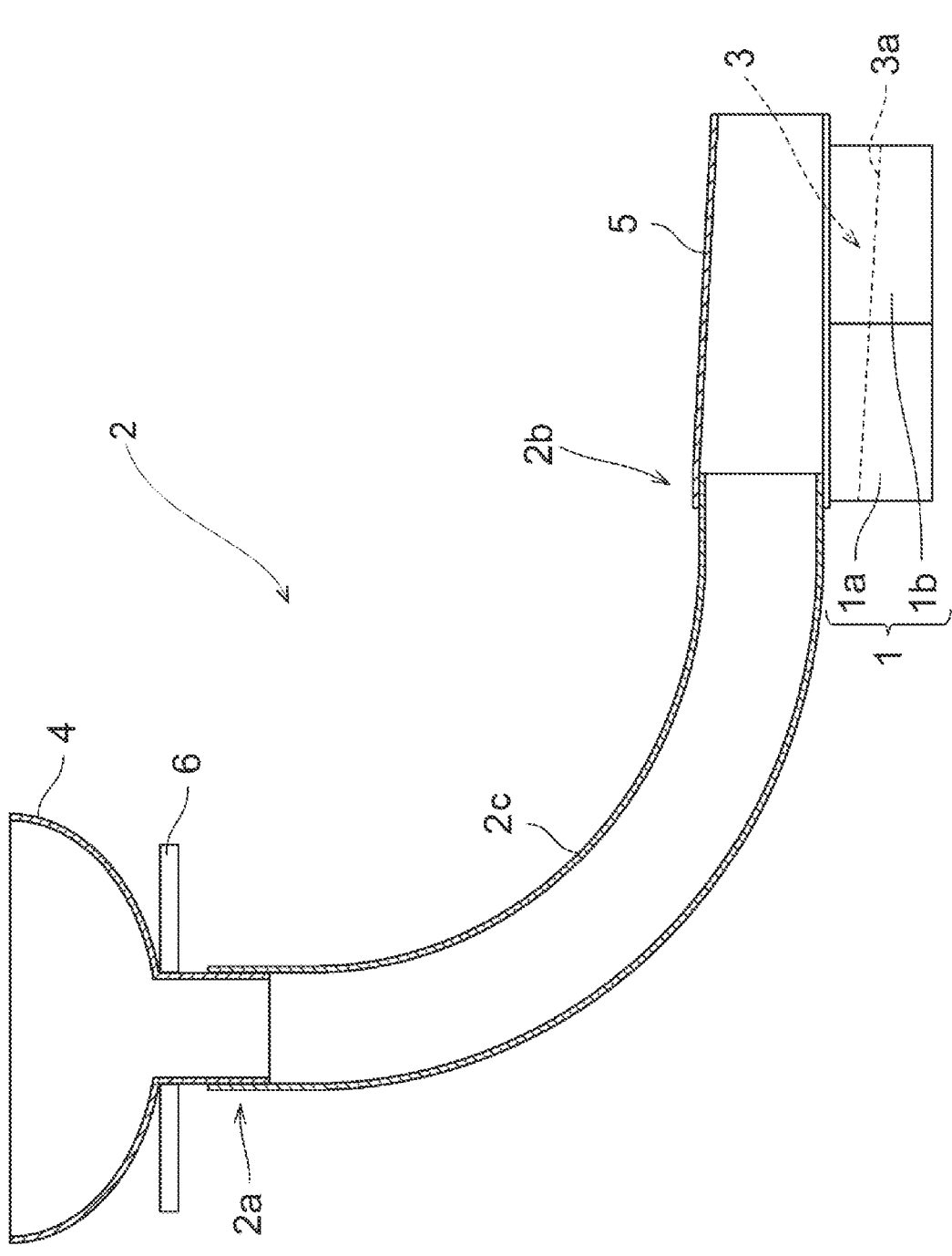
FIG. 1 is a longitudinal side view of whole test fish handling equipment.

As illustrated in FIG. 1, for example, the test fish handling equipment of the present invention includes a holder 1 for holding a relatively small test fish F (refer to FIG. 2) for biological experiments, such as a zebrafish, and guiding means 2 including a pipe member 2c for guiding the test fish F to the holder 1 together with water. As an example, as the pipe member 2c, a transparent and flexible synthetic resin pipe formed to be internally visible is used.

Figure 2:
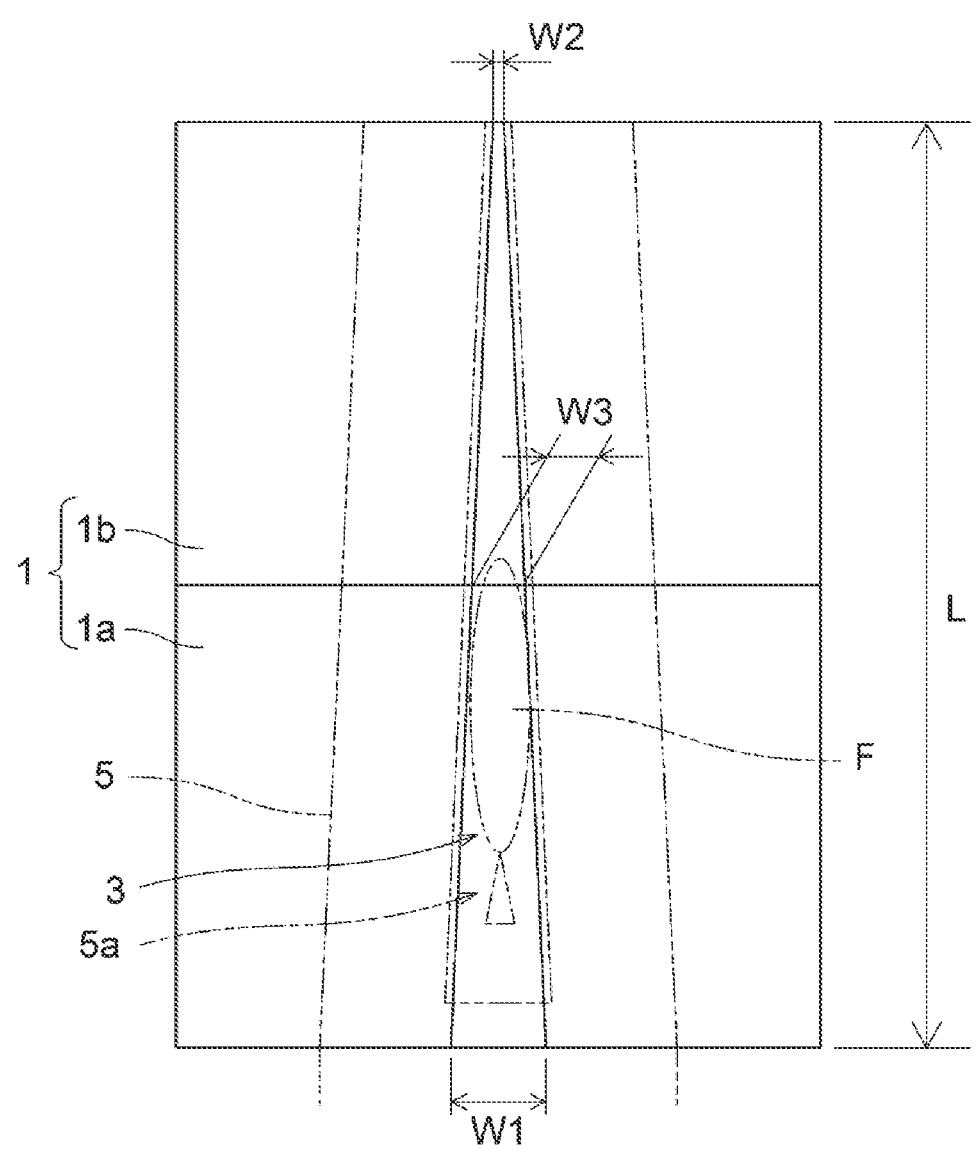
FIG. 2 is a plan view of a holder of the test fish handling equipment.

As illustrated in FIG. 2, the holder 1 is formed in a rectangular shape as a whole in a plan view, and is made of a flexible, water-permeable, and water-retentive material, such as sponge. For example, the holder 1 includes a posture maintaining groove 3 having a bottom and an upward opening, which maintains a predetermined posture in a natural state where the test fish F has no unreasonable limit.

As illustrated in FIG. 2, the posture maintaining groove 3 of the holder 1 is provided over an entire length of the holder 1 from a rear end to a front end in this illustrated form so that a length L in a front-rear direction which is a length in a longitudinal direction is longer than a body length of the test fish F. For example, when the test fish F is the zebrafish with the body length of approximately 40 mm, it is desirable that the length L of the posture maintaining groove 3 is set to approximately 50 mm. A horizontal width of the posture maintaining groove 3 is gradually tapered toward a front end side in a plan view so that a rear end portion has a maximum horizontal width W1 wider than the horizontal width of the test fish F, and a front end portion has a minimum horizontal width W2 narrower than the horizontal width of the test fish F. As illustrated in FIG. 1, a bottom 3a of the posture maintaining groove 3 is inclined downward toward a front end side in a side view.

Figure 5:
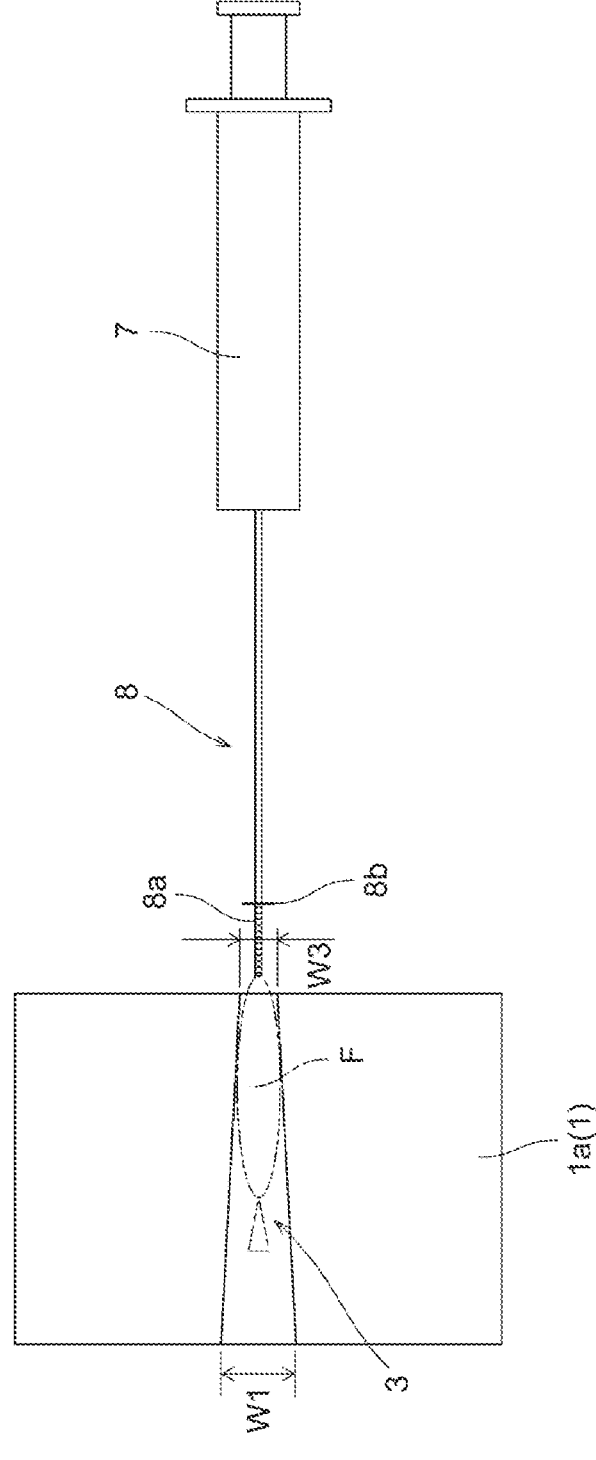
FIG. 5 is a plan view illustrating a state where oral administration is performed on a test fish.

The holder 1 includes a rear end side holding portion 1a and a front end side holding portion 1b which bisect the posture maintaining groove 3 in the longitudinal direction. Both holding portions 1a and 1b are separable. As illustrated in FIGS. 2 and 5, the horizontal width of the posture maintaining groove 3 in a front end side end portion of the rear end side holding portion 1a is set to an intermediate horizontal width W3 in which only a mouth or a head of the test fish F protrudes toward the front end side from the rear end side holding portion 1a in a state where the test fish F is maintained in a predetermined posture by the posture maintaining groove 3 of the rear end side holding portion 1a.

As illustrated in FIG. 1, the guiding means 2 for guiding the test fish F includes a pipe member 2c. One end of the pipe member 2c includes a supply port 2a through which the test fish F is supplied together with the water, and the other end of the pipe member 2c includes a discharge port 2b through which the test fish F is discharged to the posture maintaining groove 3 together with the water. A funnel-shaped funnel portion 4 for guiding the test fish F into the pipe member 2c together with water is connected to the supply port 2a, and a pipe-shaped discharge portion 5 is connected to the discharge port 2b. The discharge portion 5 is disposed above and adjacent to the posture maintaining groove 3.

Figure 3:
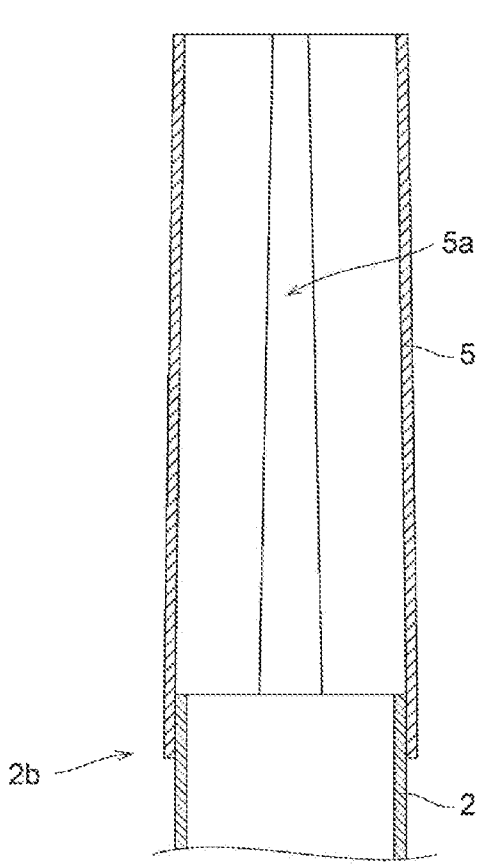
FIG. 3 is a cross-sectional plan view of a discharge portion of the test fish handling equipment.
Figure 4:
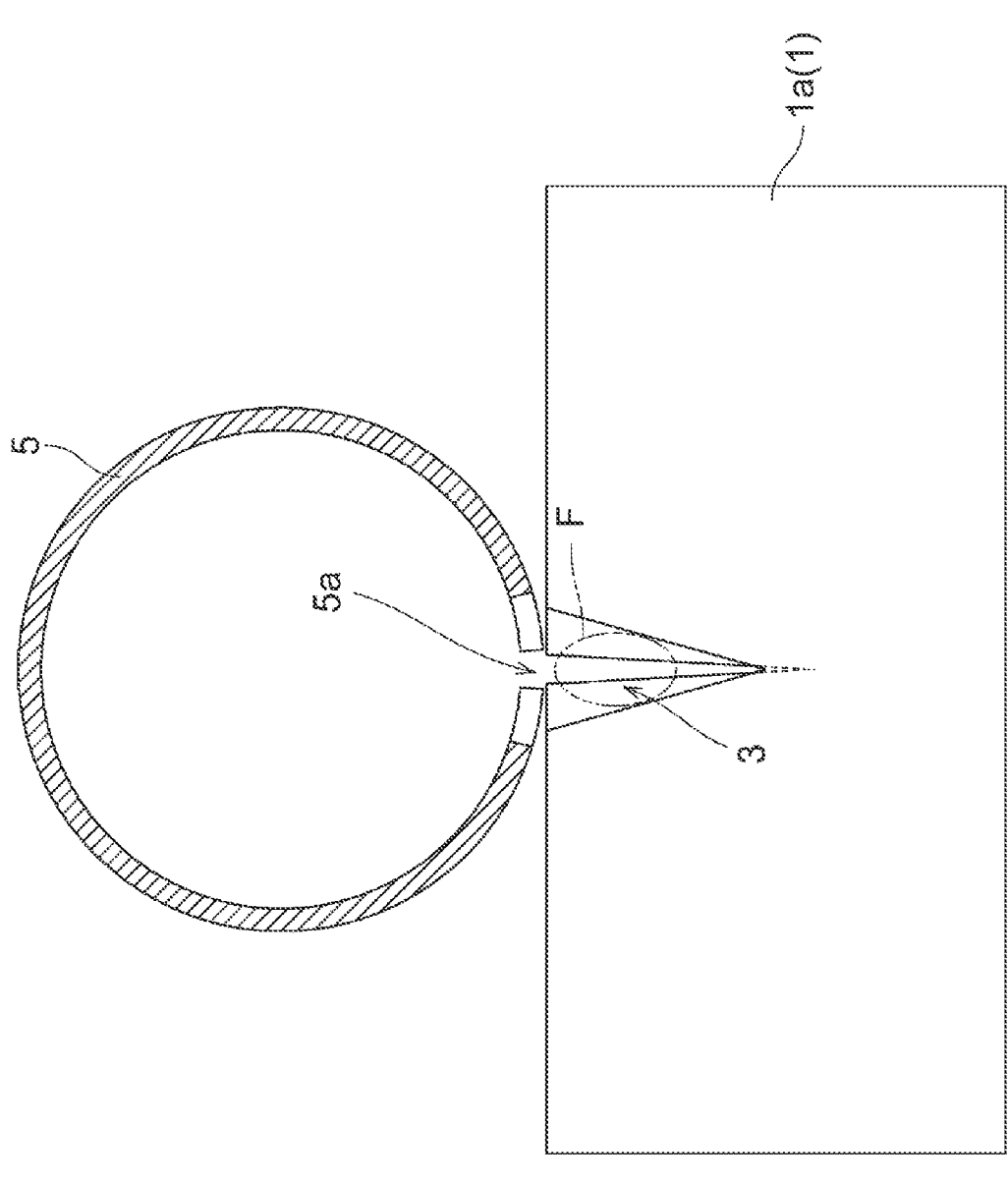
FIG. 4 is a rear view illustrating a relationship between the holder and the discharge portion of the test fish handling equipment.

As illustrated in FIG. 3, the discharge portion 5 includes a tapered slit 5a through which the test fish F is discharged to the posture maintaining groove 3 in a predetermined posture together with the water. As illustrated in FIG. 4, the slit 5a of the discharge portion 5 is disposed to face the posture maintaining groove 3 of the holder 1 from above along the roove 3. The guiding means 2 and the holder 1 which include the funnel portion 4 or the discharge portion 5 are installed by an unillustrated installation device 6 (only a portion illustrated in FIG. 1) so that the funnel portion 4 of the guiding means 2 is located above and the discharge portion 5 is located below.

In the illustrated form, an example in which each of the funnel portion 4 and the discharge portion 5 is configured separately from the pipe member 2c has been described. However, one or both of the funnel portion 4 and the discharge portion 5 may be configured integrally with the pipe member 2c.

The pipe member 2c serving as the guiding means 2 is disposed in a state of being inclined downward from the supply port 2a to the discharge port 2b. The inclined state of the pipe member 2c is properly set to a state where the test fish F supplied to the supply port 2a can be properly guided to the discharge port 2b while a burden on the test fish F is reduced. For example, it is desirable that a height in a vertical direction between the supply port 2a and the discharge port 2b in the pipe member 2c falls within a range of 100 to 300 mm. When the height of the pipe member 2c is smaller than 100 mm, in some cases, the test fish F supplied to the supply port 2a may stop in an intermediate portion of the pipe member 2c, and may not reach the discharge port 2b. On the other hand, when the height of the pipe member 2c exceeds 300 mm, the following problems arise. A moving speed of the test fish F supplied to the supply port 2a toward the discharge port 2b becomes excessive, thereby excessively increasing the burden on the test fish F, the test fish F vigorously discharged from the discharge port 2b enters the posture maintaining groove 3 in a vertical posture, or the test fish F vigorously discharged from the discharge port 2b is dropped without staying in the posture maintaining groove 3. In addition, it is desirable that a horizontal distance in the front-rear direction between the supply port 2a and the discharge port 2b in the pipe member 2c falls within a range of 150 to 300 mm. When the distance of the pipe member 2c is smaller than 150 mm, in some cases, a moving distance of the test fish F supplied to the supply port 2a toward the discharge port 2b may be too short, and an orientation of the test fish F may not be fixed. On the other hand, when the distance of the pipe member 2c exceeds 300 mm, there is a problem in that the moving distance of the test fish F supplied to the supply port 2a toward the discharge port 2b becomes excessive, thereby excessively increasing the burden on the test fish F.

Figure 13:
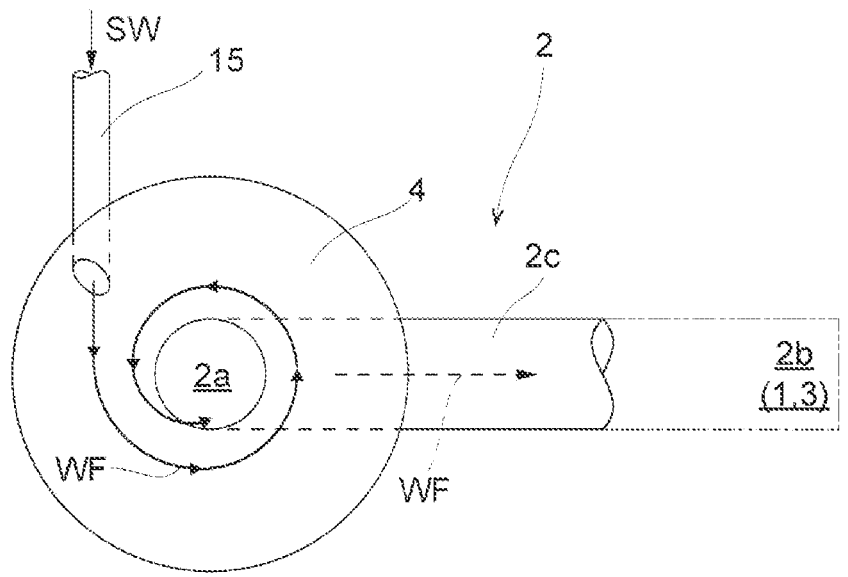
FIG. 13 is a plan view of a supply port portion of guiding means including water flow forming means.

As illustrated in FIG. 13, a water supply pipe 15 for supplying water SW into the funnel portion 4 is connected to the funnel portion 4. The water supply pipe 15 functions as water flow forming means for supplying the water to the supply port 2a of the guiding means 2 to form a water flow WF inside the pipe member 2c. The water flow WF is formed inside the pipe member 2c connected to the supply port 2a. Therefore, while the burden on the test fish F moving inside the pipe member 2c can be reduced as much as possible, the test fish F supplied to the supply port 2a can be guided to the discharge port 2b by being ridden on the water flow WF formed inside the pipe member 2*c*, and can be discharged from the discharge port 2*b* to the posture maintaining groove 3 of the holder 1.

Furthermore, in a plan view illustrated in FIG. 13, a water supply direction of the water supply pipe 15 inside the funnel portion 4 is a circumferential direction around a central axis of the supply port 2*a*. In this way, the water flow WF flows into the supply port 2*a* while swirling inside the funnel portion 4. Therefore, the burden on the supplied test fish F can be reduced by maintaining a wet state of a whole inner wall surface of the funnel portion 4.

Next, a test fish handling method using this test fish handling equipment will be described.

First, the test fish handling equipment is installed as illustrated in FIG. 1, and the test fish F is supplied into the funnel-shaped funnel portion 4 together with the water. In this case, the water flows downward inside the pipe member 2*c*. Therefore, the test fish F swims while the head is directed downward according to its habit, and enters the posture maintaining groove 3 together with the water from the slit 5*a* of the discharge portion 5 in a predetermined posture, that is, in a state where the head is directed toward the front end side holding portion 1*b*. In the posture maintaining groove 3, the water further flows toward the front end side of the holder 1. Therefore, the test fish F also flows together, and is finally stopped in a state of being pinched by the posture maintaining groove 3.

When the rear end side holding portion 1*a* of the holder 1 is separated from the front end side holding portion 1*b* in this pinched state, as illustrated in FIG. 5, the holder 1 is set so that only the mouth or the head of the test fish F protrudes to the front end side from the rear end side holding portion 1*a*. Therefore, the test fish F is maintained in a predetermined posture in the posture maintaining groove 3 of the rear end side holding portion 1*a*. In this manner, the direct oral administration of the test substance can be performed on the test fish F by a syringe 7 including the oral probe 8 (oral tube).

Specifically, the test substance is enclosed in the syringe 7, a front end portion 8*a* of the oral probe 8 mounted on the syringe 7 is inserted into an oral cavity of the test fish F, and the test substance is directly orally administered to the test fish F through the oral probe 8. At this time, the test fish F is held so that only the mouth or the head protrudes to the front end side from the rear end side holding portion 1*a*. Therefore, a gill cover of the test fish F is in a state of being pinched and closed by the posture maintaining grooves 3. Therefore, the directly orally administered test substance is prevented from leaking out of the body of the test fish F through the gill, and substantially the total amount of the test substances is taken by the test fish F.

The test substance is not limited to a liquid substance, and may be in a jelly state, a paste state, or a solid state. Alternatively, the test substance mixed with the food, the test substance encapsulated in a microcapsule, or the coated test substance may be directly orally administered to the test fish F in a state of being dispersed in the water or a dispersion liquid.

At least the front end portion 8*a* of the oral probe 8 which is inserted from the mouth of the test fish F is made of a flexible material. Therefore, the burden on the test fish F during insertion is reduced. Furthermore, a proximal end side of the front end portion 8*a* is provided with a mark 8*b* that enables visual confirmation of a range to be inserted from the mouth of the test fish F. Therefore, even an inexperienced experimenter can safely and stably perform the direct oral administration.

The flexible oral probe 8 and the syringe 7 can be manufactured through integral molding.

When the oral probe 8 and the syringe 7 are manufactured through the integral molding, it is possible to prevent the test substance such as an administration agent from staying at a joint portion between the oral probe 8 and syringe 7, and in addition, it is possible to prevent the joint portion from being dislocated during direct oral administration work.

EXPERIMENTAL EXAMPLE

Experiments 1 to 4 for confirming effectiveness of the test fish handling method using the test fish handling equipment according to the present invention will be described below. The direct oral administration method adopted in each experiment is as follows.
(Direct Oral Administration Method)

Example: In a state illustrated in FIG. 5 (state where the test fish F is held by the holder 1 by using the test fish handling equipment according to the present invention), the test substance is directly orally administered to the test fish F by using the syringe without any anesthesia.

Comparative Example: In a state where the test fish is held with a hand wearing a rubber glove for experiments, the test substance is directly orally administered to the test fish F by using the syringe without any anesthesia.

Experiment 1

For each direct oral administration method of the example and the comparative example, an effect evaluation experiment is performed to obtain a relationship between concentration of the test substance and a mortality rate by administering the test substance to the test fish under the following experimental condition.

Experimental Conditions

Test fish and number of test fishes: zebrafish, 4 to 5 fishes/1 water tank×6 Test substance: Potassium dichromate solution at 3 types of the concentration (10 mg/kg, 100 mg/kg, and 1000 mg/kg)
Dose per one fish: 20 μL

Experimental Result

Figure 6:
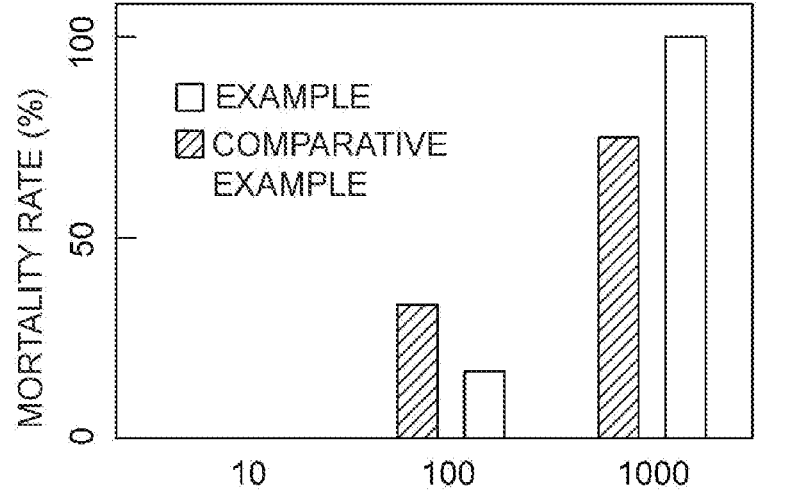
FIG. 6 is a graph illustrating an experimental result of Experiment 1.

FIG. 6 illustrates the relationship between the concentration of the test substance and the mortality rate which is obtained in this experiment. In this experimental result, when the direct oral administration method in the example is adopted, compared to when the direct oral administration method in the comparative example is adopted, a correlation is found in the relationship between the concentration of the test substance administered to the test fish and the mortality rate. Therefore, compared to when the test fish is held with the hand wearing the rubber glove for experiments, the direct oral administration can be more accurately performed by using the test fish handling equipment according to the present invention.

Experiment 2

Regarding the direct oral administration method of the example, an effect evaluation experiment is performed to determine a relationship between the concentration of the test substance and the mortality rate by administering the test substance to the test fish under the following experimental condition.

Experimental Conditions

Test fish and number of test fishes: zebrafish, 5 fishes/1 water tank×4

Test substance: Potassium dichromate solution at 4 types of the concentration (10 mg/kg, 100 mg/kg, 500 mg/kg, 1,000 mg/kg)

Dose per one fish: 20 μL

Experimental Result

Figure 7:
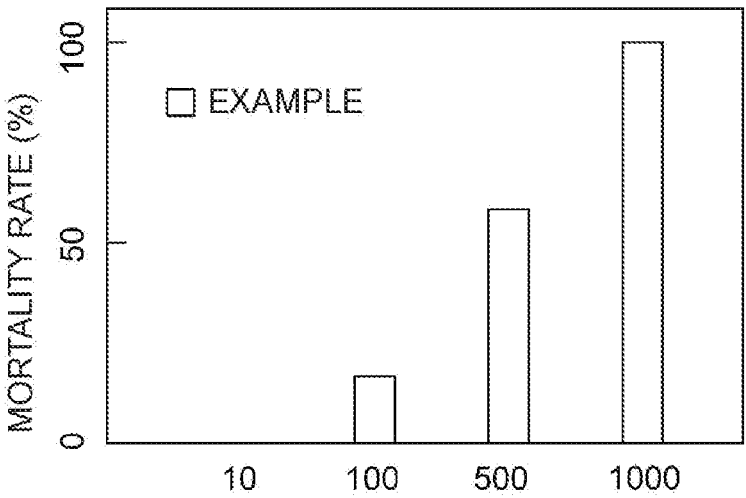
FIG. 7 is a graph illustrating an experimental result of Experiment 2.

FIG. 7 illustrates the relationship between the concentration of the test substance and the mortality rate which is obtained in this experiment. In this experimental result as well, when the direct oral administration method of the example is adopted as in Experiment 1 above, a correlation is found in the relationship between the concentration of the test substance administered to the test fish and the mortality rate. Therefore, the direct oral administration can be accurately performed by using the test fish handling equipment according to the present invention.

Experiment 3

In each direct oral administration method of the example and the comparative example, an experiment is performed to visually confirm a leakage of the test substance administered to the test fish from the gill under the following experimental condition.

Experimental Conditions

Test fish and number of test fishes: zebrafish, 4 fishes/1 water tank×1

Test substance: methylene blue

Experimental Result

In the direct oral administration method of the comparative example, it is possible to visually confirm a leakage of ethylene blue (test substance) from the gills of all four test fishes inside the water tank.

On the other hand, in the direct oral administration method of the example, it is not possible to visually confirm the leakage of ethylene blue (test substance) in all four test fishes inside the water tank. Therefore, since the test fish handling equipment according to the present invention is used, compared to when the test fish is held with the hand wearing the rubber glove for experiments, the direct oral administration can be performed accurately without damaging the test fish.

Experiment 4

In the direct oral administration method of the example, an experiment is performed to evaluate damage to the test fish by continuously performing the direct oral administration at a predetermined frequency under the following experimental condition.

Experimental Conditions

Test fish and number of test fishes: zebrafish, 10 fishes×2

Test substance: methylene blue

Experimental Result

In the direct oral administration method of the example, when the direct oral administration is performed on 10 test fishes at a frequency of once/week, no dead test fish exists even after approximately two months. Furthermore, when the direct oral administration is performed on another 10 test fishes at a frequency of 3 times/week, similarly, no dead test fish exists even after approximately two months. Therefore, the direct oral administration can be accurately performed without damaging the test fish by using the test fish handling equipment according to the present invention.

Other Embodiments of Holder

Next, other embodiments 1 and 2 of the holder 1 will be described with reference to the drawings. In describing another embodiment of the holder 1, the description will mainly focus on a configuration different from that of the previous embodiment, and description of elements configured in the same manner as in the previous embodiment will be omitted.

Another Embodiment 1 of Holder 1

Figure 8:
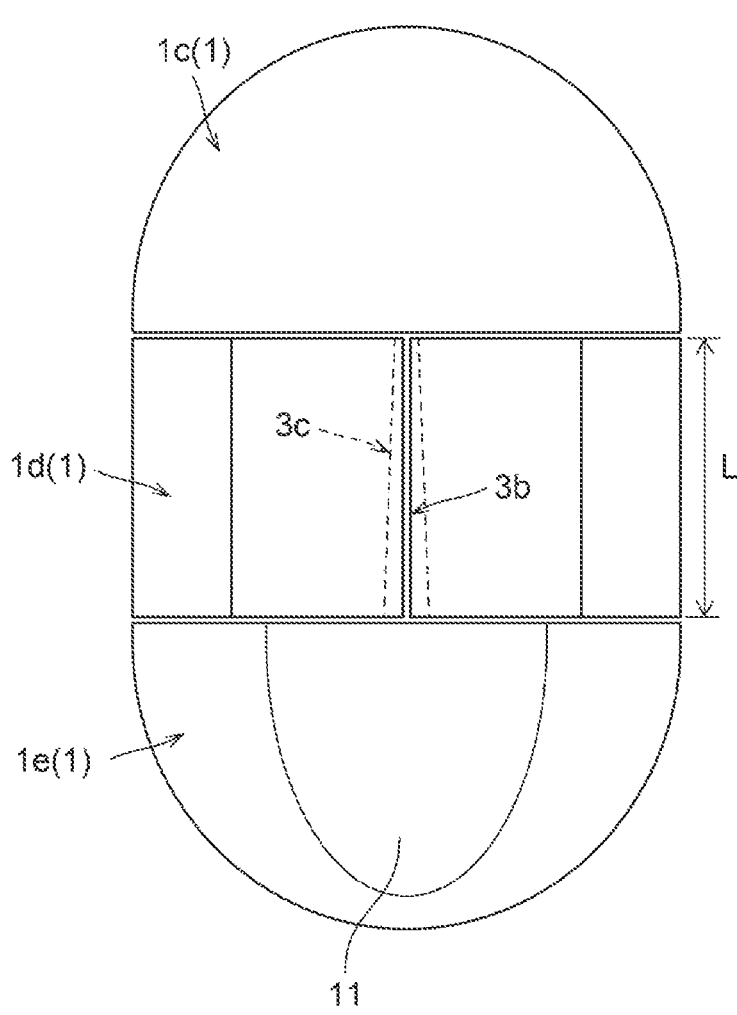
FIG. 8 is a plan view of a fish holder in another embodiment.

As illustrated in FIG. 8, the holder 1 includes a front holding portion 1c, an intermediate holding portion 1d, and a rear holding portion 1e which are aligned along the longitudinal direction of the posture maintaining groove 3, in a state where the intermediate holding portion 1d is located between the front holding portion 1c and the rear holding portion 1e. In addition, in the holder 1, three holding portions of the front holding portion 1c, the intermediate holding portion 1d, and the rear holding portion 1e are separable.

The posture maintaining groove 3 is provided only in the intermediate holding portion 1d among the front holding portion 1c, the intermediate holding portion 1d, and the rear holding portion 1e. The posture maintaining groove 3 is provided over the entire length from the rear end to the front end of the intermediate holding portion 1d. That is, in the posture maintaining groove 3, the front end is located at a boundary between the front holding portion 1c and the intermediate holding portion 1d, and the rear end is located at a boundary between the intermediate holding portion 1d and the rear holding portion 1e. The posture maintaining groove 3 is formed so that the length L in the front-rear direction is equal to or slightly longer than the body length of the test fish F. For example, when the test fish F is the zebrafish with the body length of approximately 40 mm, it is desirable that the length L of the posture maintaining groove 3 is set to approximately 50 mm.

Figure 9:
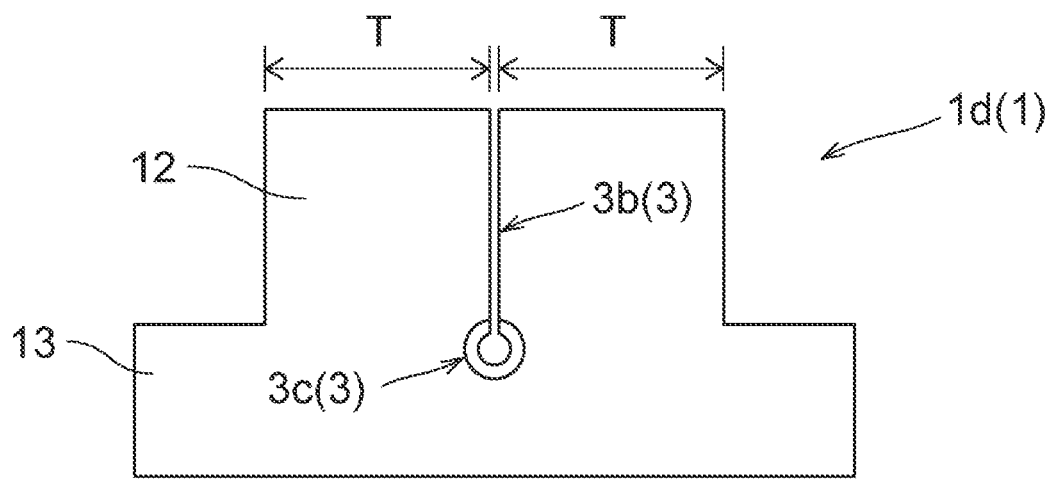
FIG. 9 is a front view of a holder (intermediate holding portion) in another embodiment.

As illustrated in FIGS. 8 and 9, the posture maintaining groove 3 includes an upper groove portion 3b that opens upward from an upper end surface of the intermediate holding portion 1d, and a lower groove portion 3c formed to continue to the upper groove portion 3b below the upper groove portion 3b. Both the upper groove portion 3b and the lower groove portion 3c are provided over the entire length of the intermediate holding portion 1d from the rear end to the front end of the intermediate holding portion 1d. The horizontal width of the upper groove portion 3b is the same horizontal width at any position in the longitudinal direction, and is narrower than the horizontal width of the test fish F. The horizontal width of the lower groove portion 3c is wider than the horizontal width of the upper groove portion 3b. In addition, the lower groove portion 3c is formed in a tapered shape in which a vertical width and the horizontal width are gradually narrowed toward the front end side. Specifically, a shape of the lower groove portion 3c when viewed in the longitudinal direction is formed in a circular shape, and the lower groove portion 3c is formed in a conical shape tapered toward the front end side.

The vertical width (depth) of the posture maintaining groove 3 is set to be larger than the vertical width of the test fish F (height of the test fish F) held by the posture maintaining groove 3 at any position in the longitudinal direction. Furthermore, in the present embodiment, the vertical width (depth) of the lower groove portion 3c is wider than the vertical width of the test fish F (height of the test fish F) at any position in the longitudinal direction. In this way, the whole test fish F in a height direction is accommodated in the lower groove portion 3c of the posture maintaining groove 3. Therefore, the test fish F is held in a more stabilized state in the lower groove portion 3c, damage to the test fish F can be more greatly prevented. For example, it is desirable that the depth of the lower groove portion 3c falls within a range of 5 to 25 mm. When the depth of the lower groove portion 3c is smaller than 5 mm, in some cases, the test fish F is less likely to enter the lower groove portion 3c. On the other hand, when the depth of the lower groove portion 3c exceeds 25 mm, the test fish F entering the lower groove portion 3c is held as it is in a vertical posture when entering the lower groove portion 3c. Therefore, in some cases, the test fish F is less likely to adopt a horizontal posture. In addition, the horizontal width of the lower groove portion 3c is wider than the horizontal width of the test fish F at any position in the longitudinal direction.

Figure 10:
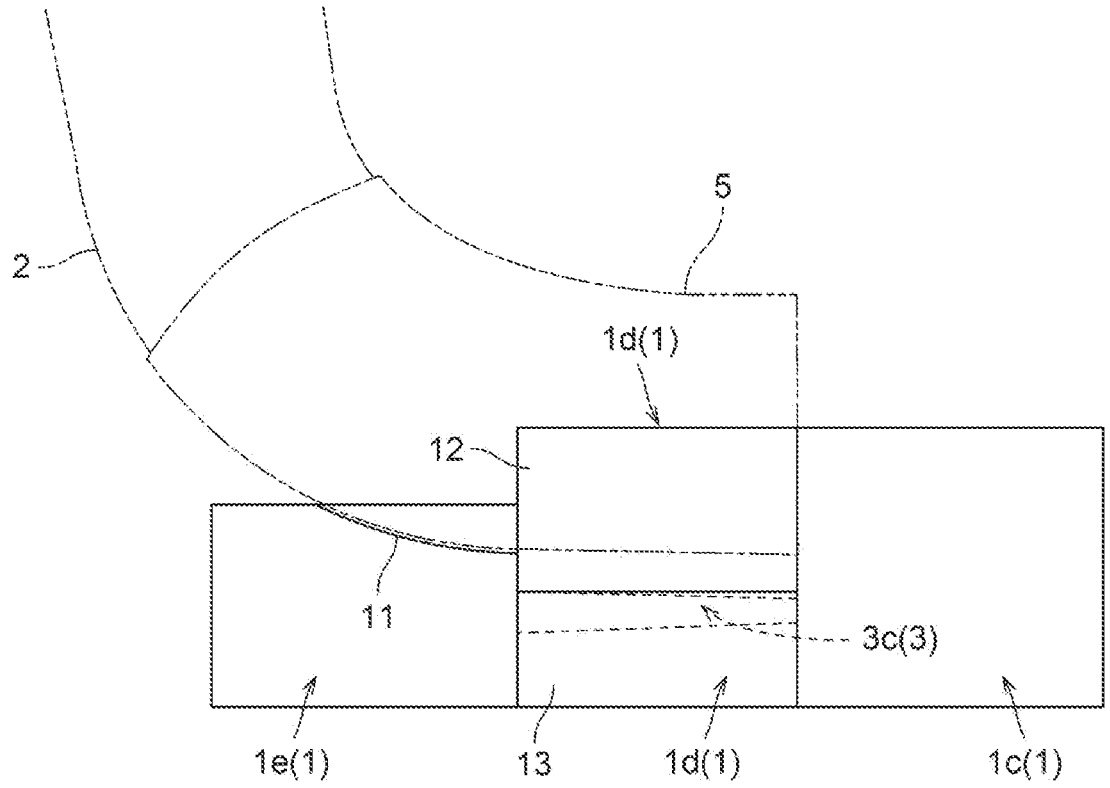
FIG. 10 is a longitudinal side view illustrating a relationship between a holder and a discharge portion in another embodiment.

As illustrated in FIGS. 8 and 10, the rear holding portion 1e is formed in a size in which the upper end surface is located below the upper end surface of the intermediate holding portion 1d. The rear holding portion 1e has a recess portion 11 recessed downward from the upper end surface. A bottom of the recess portion 11 is inclined downward toward the front end side, and the horizontal width is widened toward the front end side. The recess portion 11 is formed in a shape along an outer shape of the pipe member 2c adopting a posture inclined downward toward the front end side. The recess portion 11 is formed so that the lower end of the recess portion 11 is located above the upper end of the lower groove portion 3c. In a state where the rear holding portion 1e is aligned in contact with the rear end side of the intermediate holding portion 1d, the rear holding portion 1e closes the lower groove portion 3c from the rear end side, and closes a portion of the upper groove portion 3b from the rear end side.

Figure 11:
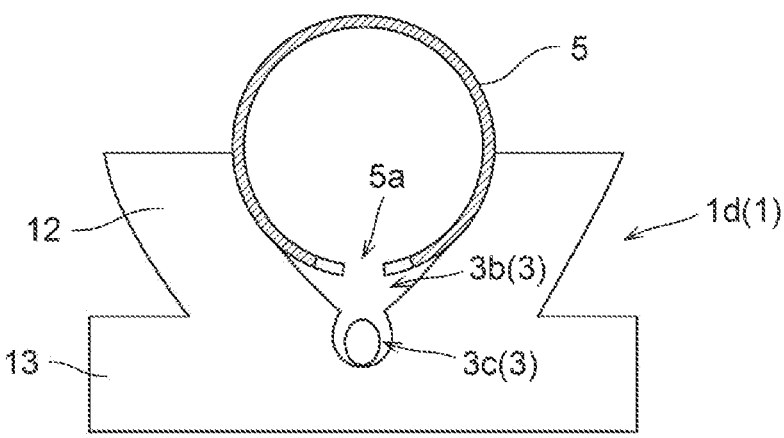
FIG. 11 is a front view illustrating a relationship between a holder (intermediate holding portion) and a discharge portion in another embodiment.
Figure 12:
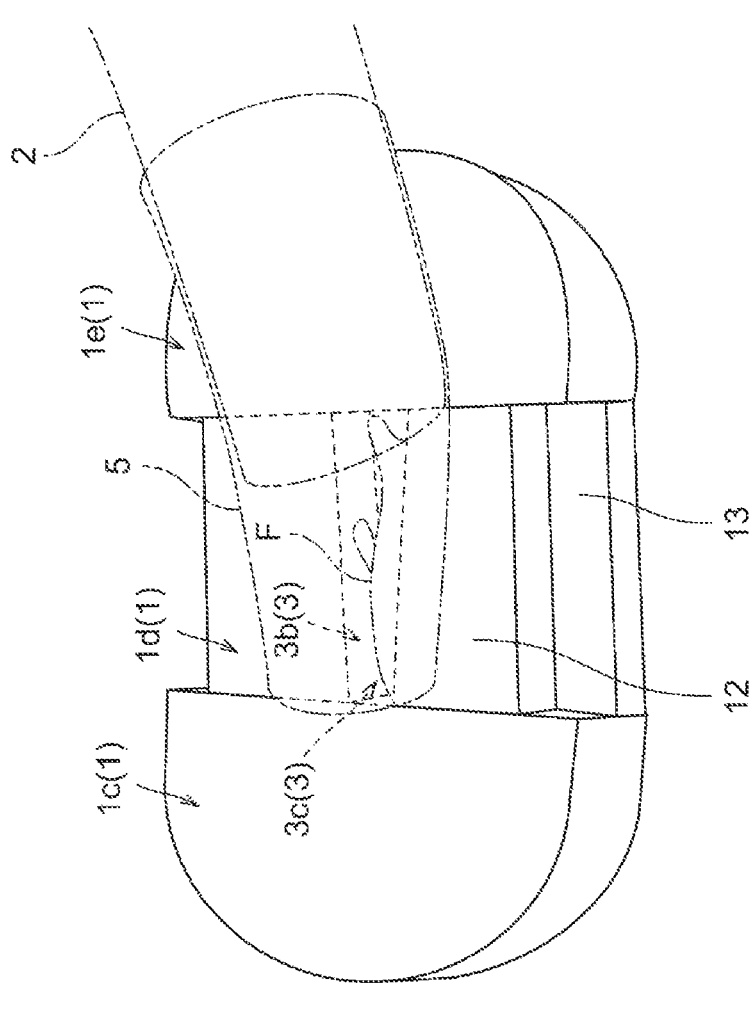
FIG. 12 is a perspective view of a holder in another embodiment.

As illustrated in FIG. 9, the intermediate holding portion 1d has an upper portion 12 and a lower portion 13 located below the upper portion 12. The upper portion 12 has the horizontal width narrower than that of the lower portion 13. Therefore, the upper portion 12 is more likely to deform in a width direction than the lower portion 13, and as illustrated in FIGS. 10 to 12, the upper portion 12 is likely to be widened in a horizontal width direction when the discharge portion 5 is installed inside the posture maintaining groove 3. That is, as illustrated in FIG. 11, the discharge portion 5 is inserted into the upper groove portion 3b of the posture maintaining groove 3 while the upper portion 12 is widened in the horizontal width direction, and the slit 5a of the discharge portion 5 is located directly above the lower groove portion 3c. In order to facilitate positioning or inserting the discharge portion 5 with respect to the upper groove portion 3b, at least the upper portion side of the upper groove portion 3b can be widely formed.

In addition, the horizontal width of the upper portion 12 is narrowly formed as described above, the lower portion 13 is likely to deform to be bent upward. Therefore, the intermediate holding portion 1d is likely to deform into a round shape so that the lower portion 13 is bent upward and the upper portion 12 is compressed in the width direction. In this manner, the test fish F can be held by compressing the lower groove portion 3c from the lower side and both sides in the horizontal width direction, and the upper groove portion 3b can be compressed and closed in the horizontal width direction.

In the holder 1, in a state where the discharge portion 5 is detached, when the upper portion 12 is pinched from both right and left sides and the lower groove portion 3c is compressed from both sides in the horizontal width direction to hold the test fish F in the lower groove portion 3c, it is desirable that each thickness T of the upper portion 12 on the right and left falls within a range of 5 to 40 mm. When the thickness T of the upper portion 12 is smaller than 5 mm, a compressive force transmitted to the test fish F held in the lower groove portion 3c when the upper portion 12 is pinched from both the right and left sides is excessively strong. Therefore, in some cases, a burden on the test fish F excessively increases. On the other hand, when the thickness T of the upper portion 12 exceeds 40 mm, the compressive force transmitted to the test fish F held in the lower groove portion 3c when the upper portion 12 is pinched from both the right and left sides is excessively weak, and the test fish F cannot be satisfactorily held. Therefore, in some cases, the gill cover of the test fish F cannot be satisfactorily closed.

As illustrated in FIG. 10, the front holding portion 1c is formed in a shape whose upper end surface has the same height as the upper surface of the intermediate holding portion 1d. Therefore, the front holding portion 1c closes the upper groove portion 3b and the lower groove portion 3c from the front end side, in a state where the front holding portion 1c is aligned in contact with the front end side of the intermediate holding portion 1d.

As illustrated in FIGS. 10 and 12, the pipe member 2c is installed so that the front end of the discharge portion 5 is placed on the recess portion 11 of the rear holding portion 1e in a state of being in contact with the front holding portion 1c. The discharge portion 5 is installed inside the posture maintaining groove 3 in a state where the lower portion is pinched by the upper portion 12 of the intermediate holding portion 1d, and the slit 5a is disposed to face the lower groove portion 3c from above along the lower groove portion 3c of the posture maintaining groove 3.

[Test Fish Handling Method]

The method for handling the test fish F of the present embodiment is configured as a method for performing a predetermined handling on the test fish F held by the holder 1 by using the test fish handling equipment described so far.

In this method for handling the test fish F, the above-described test fish handling equipment is used. Therefore, when the test fish F is held, the test fish F can be reliably held in a predetermined posture by preventing damage to the test fish F as much as possible. In this state, the predetermined handling is performed on the test fish F held by the holder 1. Therefore, the handling can be easily and reliably performed. In addition, the test fish F can be held in a stabilized state while the test fish is moisturized F in the holder 1.

Therefore, while damage to the test fish F can be greatly prevented, the predetermined handling can be repeatedly performed on the test fish F for oral administration or parenteral administration without any anesthesia.

Figure 14:
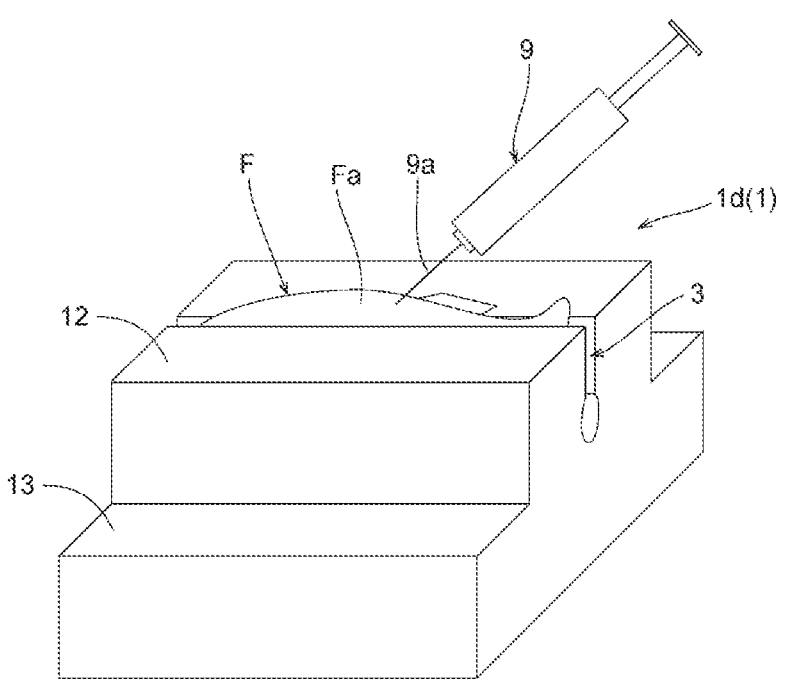
FIG. 14 is a perspective view illustrating a state where parenteral administration is performed on a test fish.

As a specific example of the method for handling the test fish F, as illustrated in FIG. 5, the predetermined handling includes an oral administration method in which oral administration is performed to directly orally administer the test substance to the test fish F through the oral probe 8 inserted into the oral cavity of the test fish F maintained in a predetermined posture by the posture maintaining groove 3 of the holder 1, and as illustrated in FIG. 14, the predetermined handling includes a parenteral administration method in which parenteral administration is performed to administer the test substance to the test fish F by injection into the test fish F maintained in a predetermined posture by the posture maintaining groove 3 of the holder 1. Hereinafter, the oral administration method and the parenteral administration method will be described.

(Oral Administration Method)

An oral administration method for directly orally administering the test substance to the test fish F by using the test fish handling equipment adopting the holder 1 of the present embodiment will be described.

First, the test fish handling equipment is installed as illustrated in FIGS. 10 and 12, and the test fish F is supplied to the funnel-shaped funnel portion 4 (refer to FIG. 1) together with water. In this case, the water flows downward inside the pipe member 2*c*. Therefore, the test fish F swims while the head is directed downward according to its habit, enters the posture maintaining groove 3 of the holder 1 from the slit 5*a* of the discharge portion 5 in a predetermined posture, that is, in a state where the head is directed toward the front end side, and is stopped in a state where the head is in contact with the front holding portion 1*c*. In this state, when the test fish F is held by separating the intermediate holding portion 1*d* of the holder 1 from the front holding portion 1*c* and the rear holding portion 1*e*, the mouth or the head of the test fish F is located near the front end of the intermediate holding portion 1*d*. Therefore, the direct oral administration can be performed on the test fish F by the syringe 7 including the oral probe 8.

In addition, in some cases, the test fish F enters the posture maintaining groove 3 in a posture opposite to a predetermined posture, that is, in a state where a caudal fin is directed to the front end side. However, in this case, the test fish F is stopped in a state where the caudal fin is in contact with the front holding portion 1*c*. In this state, when the test fish F is held by separating the intermediate holding portion 1*d* of the holder 1 from the front holding portion 1*c* and the rear holding portion 1*e*, the mouth or the head of the test fish F is located near the rear end of the intermediate holding portion 1*d*. Therefore, the direct oral administration can be performed on the test fish F by the syringe 7 including the oral probe 8.

(Parenteral Administration Method)

A parenteral administration method for administering the test substance to the test fish F by injection using the test fish handling equipment adopting the holder 1 of the present embodiment will be described.

First, the test fish handling equipment is installed as illustrated in FIGS. 10 and 12, and the test fish F is held by the posture maintaining groove 3 of the intermediate holding portion 1*d* of the holder 1 in the same manner as in the above-described oral administration method.

Next, as illustrated in FIG. 14, when an injection site of an injection needle 9*a* of an injector 9 is an abdomen Fa of the test fish F, while the burden on the test fish F is not imposed without directly touching the test fish F, the test fish F is rotated around an axis by alternately moving the upper portions 12 on both the right and left sides of the posture maintaining groove 3 of the holder 1. In this manner, the abdomen Fa of the test fish F can be exposed to the upper side of the posture maintaining groove 3. In this way, so-called intraperitoneal administration can be performed to administer the test substance by inserting the injection needle 9*a* of the injector 9 into the abdomen Fa of the test fish F which is maintained in a predetermined posture in the posture maintaining groove 3. In addition to the intraperitoneal administration, intravenous administration can also be performed by inserting the injection needle 9*a* of the injector 9 into a vein of the test fish F.

[Other Equipment Configurations]

Figure 15:
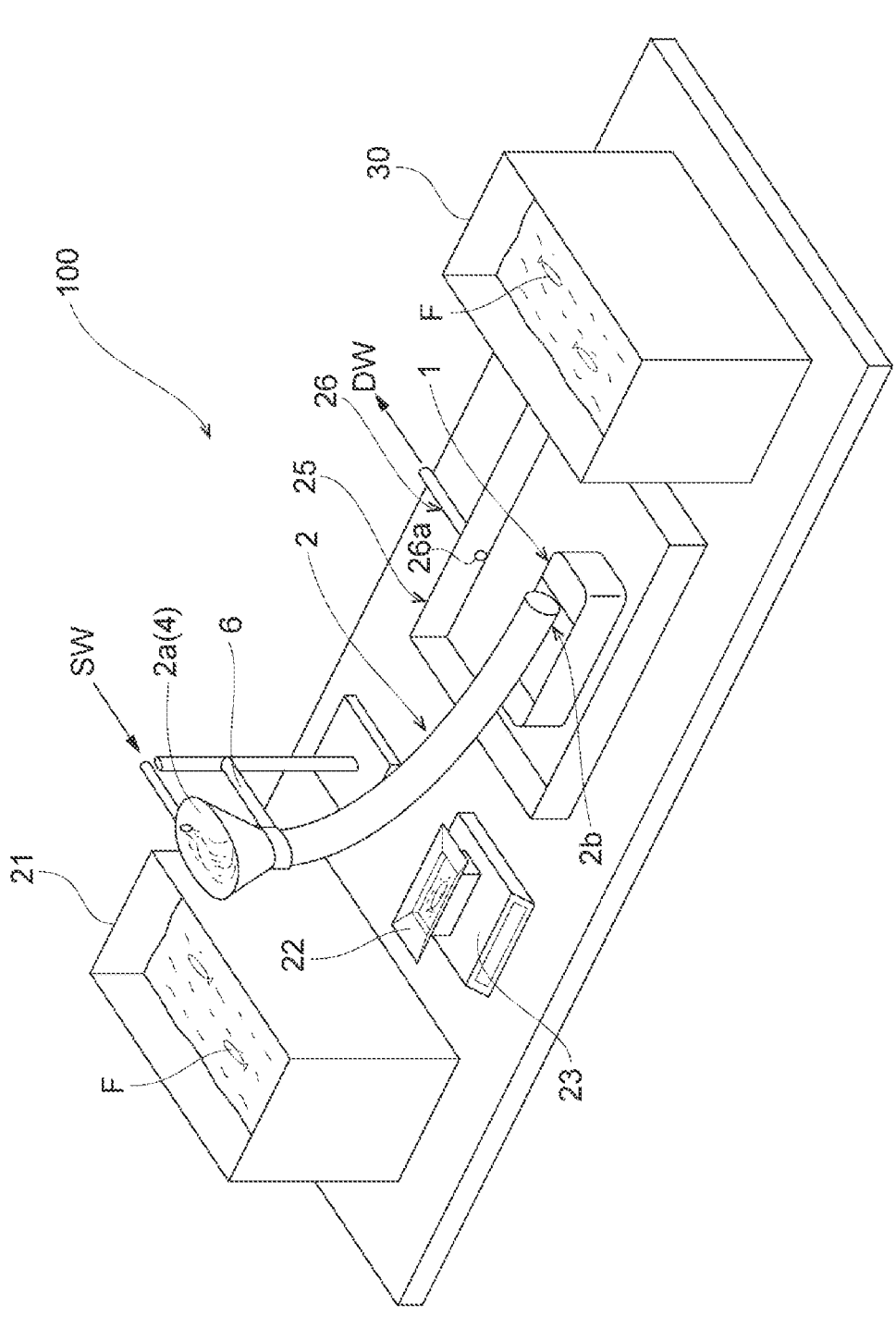
FIG. 15 is a schematic configuration diagram of whole test fish handling equipment.

FIG. 15 illustrates an overall configuration of test fish handling equipment 100 in which the holder 1 and the guiding means 2 described so far are integrated together with other equipment configurations.

The test fish handling equipment 100 includes a first water tank 21 that accommodates the test fish F before being supplied to the supply port 2*a* of the guiding means 2, and a second water tank 30 that accommodates the test fish F released from the holding of the holder 1. In this way, the test fish F accommodated in the first water tank 21 can be fetched together with the water, and can be immediately supplied to the supply port 2*a* of the guiding means 2. In addition, the test fish F released from the holding of the holder 1 can be immediately accommodated in the second water tank 30.

Furthermore, in the vicinity of the first water tank 21 and the supply port 2*a* of the guiding means 2, weighing water tank 22, for example, such as a transparent beaker for temporarily accommodating the test fish F fetched from the first water tank 21 before being supplied to the supply port 2*a* is provided. The weighing water tank 22 is placed on a weighing scale 23, and the weighing scale 23 measures the weight of the test fish F accommodated in the weighing water tank 22. In addition, in the weighing water tank 22, body length measurement, individual identification, or male/female determination is performed by observation from the outside or captured image processing. For example, the individual identification or the male/female determination can be performed through image processing, based on a face or a pattern by using a captured image of the test fish F. The water is stored in the weighing water tank 22 to accommodate the test fish F without imposing the burden. The stored water is supplied to the supply port 2*a* together with the test fish F. In addition, although the illustration is omitted, a water tap for replenishing the weighing water tank 22 with the water can be provided.

In the test fish handling equipment 100, the holder 1 serving as a handling portion is installed, and a water receiver 25 for receiving the water discharged from the discharge port 2*b* of the guiding means 2 is provided. In this way, even when the test fish F discharged from the discharge port 2*b* is dropped from the holder 1, the dropped test fish F can be accommodated in the water stored in the water receiver 25 without imposing the burden. Furthermore, the water receiver 25 is provided with a drain port 26*a* leading to a drain pipe 26 for draining the stored water. The drain port 26*a* can be provided with a net for preventing the test fish F dropped from the holder 1 from being discharged to the drain pipe 26 side.

In addition, water level maintaining means for maintaining a water storage level of the water receiver 25 at a predetermined set water level can be constructed in a state where the drain port 26a is located slightly above a bottom surface of the water receiver 25. Since this water level maintaining means is provided, a wet state of the holder 1 installed in the water receiver 25 is maintained in a constant state, and a moisturized state of the test fish F held by the holder 1 is maintained in a proper state.

In order to accurately maintain a positional relationship between the guiding means 2 and the holder 1, it is desirable to provide means for positioning the holder 1 in the water receiver 25. Although the illustration is omitted, as the positioning means, the following configuration can be adopted. For example, the holder 1 can be installed at a predetermined location of the water receiver 25 in a form in which a mark is provided at a predetermined location of the water receiver 25 and the holder 1 is installed in accordance with the mark. In addition, the holder 1 can be installed at a predetermined location of the water receiver 25 in a form in which a magnet or a magnetic material is provided to be adsorbed at a predetermined location in the water receiver 25 and in the holder 1. In addition, the holder 1 can be installed at a predetermined location of the water receiver 25 in a form in which a hook-and-loop fastener is provided to be adsorbed at a predetermined location in the water receiver 25 and in the holder 1. In addition, the holder 1 can be installed at a predetermined location of the water receiver 25 in a form in which a recess portion is provided at a predetermined location of the water receiver 25 and the holder 1 is fitted into the recess portion.

The whole test fish handling equipment 100 configured in this way can be surrounded by a cover to prevent contamination. Furthermore, clean air can be supplied to a space surrounded by the cover.

Another Embodiment (1) In the previous embodiment, an example in which the whole holder 1 is made of sponge has been described. However, the holder 1 can be made of other flexible, water-permeable, and water-retentive materials, for example, such as nonwoven fabric. Furthermore, as long as the holder 1 is flexible, the holder 1 can be made of materials other than the sponge or the nonwoven fabric, for example, such as soft rubber and synthetic cloth. In this case, not only is the whole holder 1 made of a flexible material, but also is the holder 1 made of non-flexible polystyrene foam, for example. A flexible material can be affixed to the inner surface of the posture maintaining groove 3 of the holder 1.

In addition, the shape of the posture maintaining groove 3 of the holder 1 can be appropriately changed in accordance with the type or the habit of the test fish F. In a plan view, the posture maintaining groove 3 does not need to be formed to be tapered toward the front end side, and in a side view, the bottom 3a does not need to be inclined downward toward the front end side. In particular, it is preferable that the horizontal width of the posture maintaining groove 3 is changed to be suitable for biological observations or biological experiments. For example, regarding the horizontal width of the posture maintaining groove 3 of the holder 1, it is possible to adopt a shape widened toward the front end side in a plan view, or a shape which does not vary between the proximal end side and the front end side in a plan view. In addition, regarding the bottom of the posture maintaining groove 3 of the holder 1, it is possible to adopt a shape inclined upward toward the front end side, or a horizontal shape between the proximal end side and the front end side.

Figure 16:
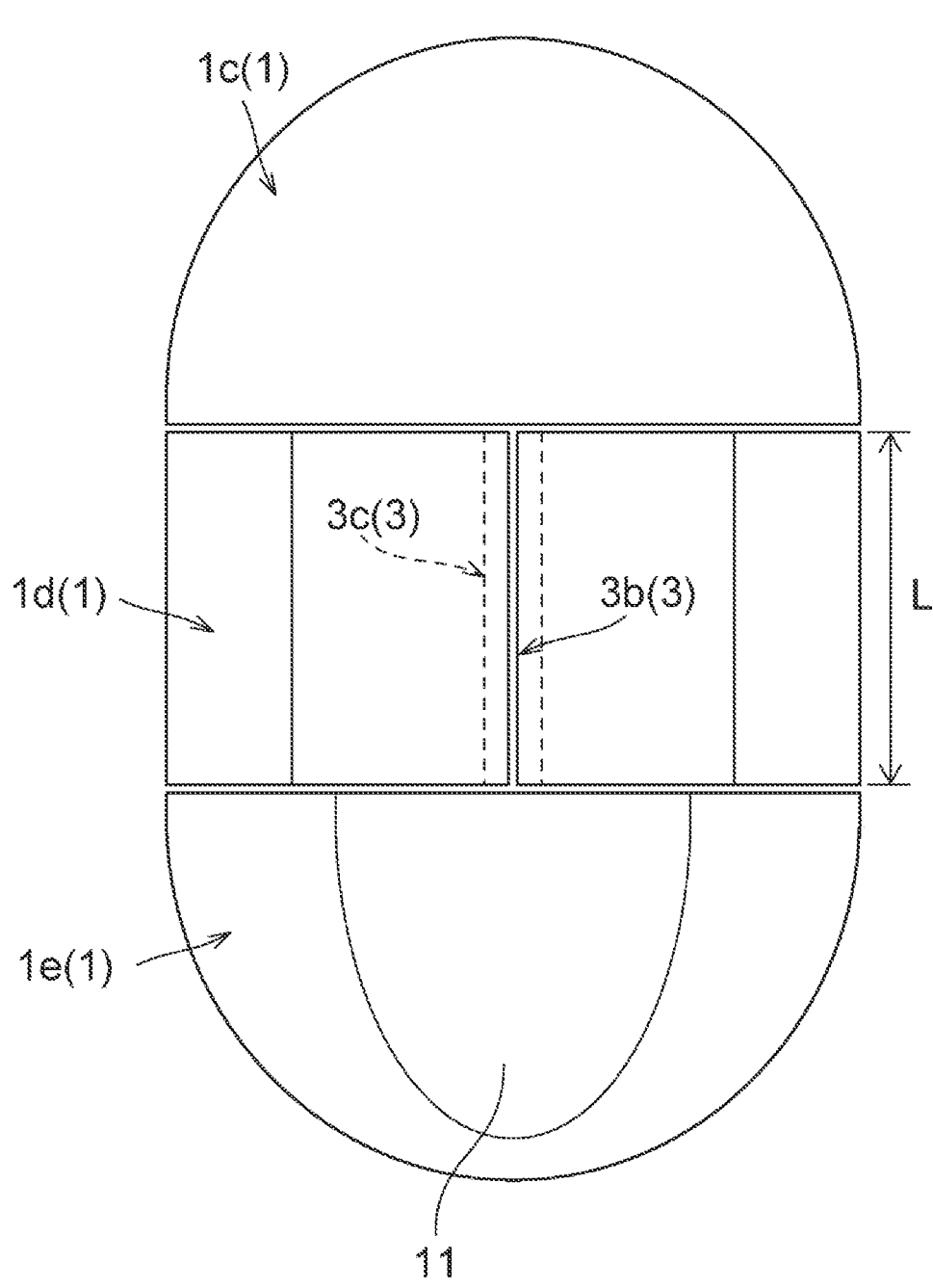
FIG. 16 is a plan view of a fish holder in another embodiment.
Figure 17:
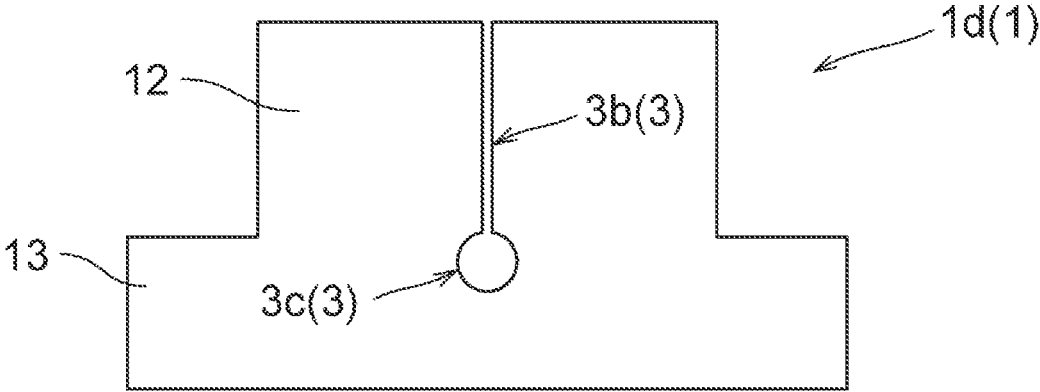
FIG. 17 is a front view of a holder (intermediate holding portion) in another embodiment.

For example, in the intermediate holding portion 1d of the holder 1, the posture maintaining groove 3 can be formed as illustrated in FIGS. 16 and 17. That is, the posture maintaining groove 3 is formed with the same width from the front end side to the rear end side, and includes the upper groove portion 3b that opens upward, and the lower groove portion 3c that continues below the upper groove portion 3b and has the width wider than that of the upper groove portion 3b. Since the posture maintaining groove 3 is adopted in this way, the test fish F discharged together with the water to the upper groove portion 3b that opens upward in the posture maintaining groove 3 can be smoothly received by the upper groove portion 3b while the posture is maintained. The test fish F can be smoothly guided to the lower groove portion 3c that is formed below and has the width wider than that of the upper groove portion 3b, and the test fish F can be held by the lower groove portion 3c with less burden.

Figure 18:
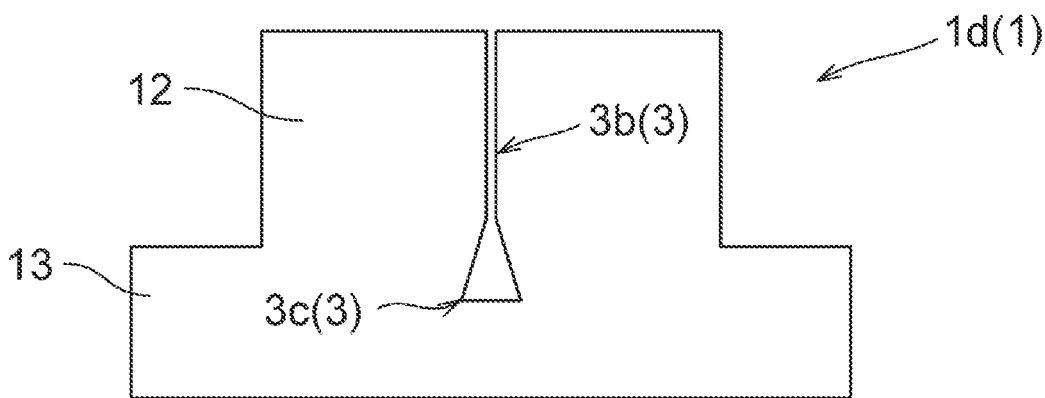
FIG. 18 is a front view of a holder (intermediate holding portion) in another embodiment.
Figure 19:
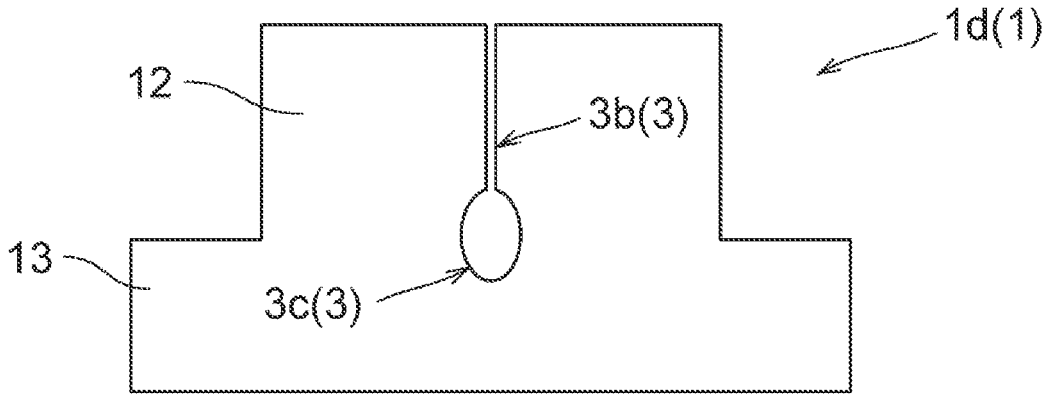
FIG. 19 is a front view of a holder (intermediate holding portion) in another embodiment.
Figure 20:
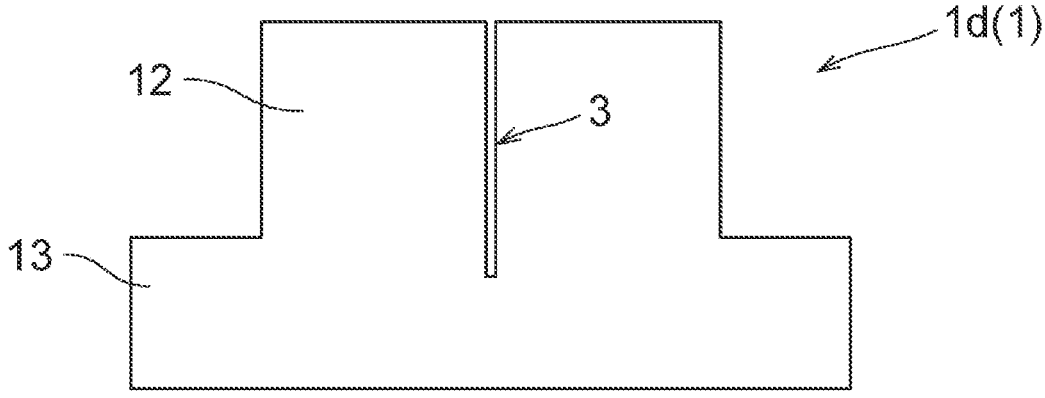
FIG. 20 is a front view of a holder (intermediate holding portion) in another embodiment.

Furthermore, in the previous embodiment, in the intermediate holding portion 1d of the holder 1, the shape of the lower groove portion 3c when viewed in the longitudinal direction is a circular shape. However, a triangular shape can be used as illustrated in FIG. 18, an elliptical shape can be used as illustrated in FIG. 19, or a narrow groove shape may be used by omitting the wide lower groove portion 3c (refer to FIGS. 8, 9, 16, and 17) as illustrated in FIG. 20.

(2) In the previous embodiment, the following configuration has been described as an example. The holder 1 is divided into the rear end side holding portion 1a and the front end side holding portion 1b. Only the mouth or the head of the test fish F protrudes to the front end side from the rear end side holding portion 1a in a state where the test fish F is maintained in a predetermined posture by the posture maintaining groove 3 of the rear end side holding portion 1a. However, a configuration can be adopted in which only the caudal fin of the test fish F protrudes.

For example, in a plan view, the front end side can be gradually tapered so that the rear end portion has the maximum width W1 and the front end portion has the minimum width W2. Only the caudal fin of the test fish F can be set to protrude to the rear end side from the front end side holding portion 1b in a state where the test fish F is maintained in a predetermined posture by the posture maintaining groove 3 of the front end side holding portion 1b. In this case, the caudal fin of the test fish F can be easily and reliably observed.

However, the holder 1 does not necessarily need to be divided into two pieces. The holder 1 as a whole can be configured as a single unit, or can be divided into three pieces.

(3) In the previous embodiment, an example has been described in which the guiding means 2 includes the transparent and flexible synthetic resin pipe member 2c. However, for example, the guiding means 2 can include an opaque and inflexible metal pipe member. Furthermore, the guiding means 2 can include a member other than the pipe member, for example, a gutter-shaped member having an open upper surface.

In addition, an example has been described in which the funnel-shaped funnel portion 4 is connected to the supply port 2a of the pipe member 2c serving as the guiding means 2, and the pipe-shaped discharge portion 5 is connected to the discharge port 2b. However, the funnel portion 4 and the discharge portion 5 are not indispensable, and the funnel portion 4 and the discharge portion 5 can be eliminated.

The test fish handling equipment according to the present invention can be used not only for the direct oral administration to the test fish, but also for various purposes such as various biological observations or blood samplings of test fish.

INDUSTRIAL APPLICABILITY

The present invention can be suitably used as test fish handling equipment and a test fish handling method which can reliably hold a test fish in a predetermined posture.

REFERENCE SIGNS LIST

1 holder
1*a* rear end side holding portion
1*b* front end side holding portion
2 guiding means
2*a* supply port
2*b* discharge port
2*c* pipe member
3 posture maintaining groove
3*a* bottom of posture maintaining groove
4 funnel portion
5 discharge portion
5*a* slit
7 syringe
8 oral probe (oral tube)
9 injector
15 water supply pipe (water flow forming means)
21 first water tank
25 water receiver
30 second water tank
100 test fish handling equipment
F test fish
SW water supply
WF water flow

The invention claimed is:

1. Test fish handling equipment comprising:
a holder for holding a test fish to which a test substance is administered as a predetermined handling,
wherein the holder comprises a posture maintaining groove for maintaining the test fish supplied together with water in a predetermined posture,
and at least an inner surface of the posture maintaining groove is made of a flexible material; and
wherein the posture maintaining groove comprises an upper groove portion that opens upward and a lower groove portion that continues downward and is wider than the upper groove portion.

2. The test fish handling equipment according to claim 1, wherein the holder is made of a flexible, water-permeable, and water-retentive material.

3. The test fish handling equipment according to claim 1, wherein the posture maintaining groove is tapered toward a front end side.

4. The test fish handling equipment according to claim 1, wherein the posture maintaining groove is formed with a same width from a front end side to a rear end side.

5. The test fish handling equipment according to claim 1, wherein a depth of the posture maintaining groove is set to be greater than a height of the test fish held by the posture maintaining groove.

6. A test fish handling method comprising:
using the test fish handling equipment according to claim 1; and
administering a test substance to the test fish held by the holder as a predetermined handling.

7. The test fish handling method according to claim 6, wherein as the predetermined handling, oral administration is performed to directly and orally administer a test substance to the test fish through an oral tube inserted into an oral cavity of the test fish maintained in a predetermined posture by the posture maintaining groove of the holder.

8. The test fish handling method according to claim 6, wherein as the predetermined handling, parenteral administration is performed to administer a test substance to the test fish by injection into the test fish maintained in a predetermined posture by the posture maintaining groove of the holder.

9. Test fish handling equipment comprising:
a holder for holding a test fish to which a test substance is administered as a predetermined handling, wherein the holder comprises a posture maintaining groove for maintaining the test fish supplied together with water in a predetermined posture, and at least an inner surface of the posture maintaining groove is made of a flexible material; and
guiding means for guiding the test fish to the holder together with water,
wherein a first end of the guiding means comprises a supply port through which the test fish is supplied together with water, and a second end comprises a discharge port through which the test fish is discharged to the posture maintaining groove together with the water,
wherein the guiding means comprises a pipe member having a first end including the supply port and a second end including the discharge port,
a pipe-shaped discharge portion disposed above and adjacent to the posture maintaining groove is connected to the discharge port,
the discharge portion comprises a slit facing along the posture maintaining groove, and
the test fish is discharged from the slit to the posture maintaining groove in a predetermined posture together with the water.

10. The test fish handling equipment according to claim 9, further comprising:
a first water tank that accommodates the test fish before being supplied to the supply port; and
a second water tank that accommodates the test fish released from holding of the holder.

11. The test fish handling equipment according to claim 9, wherein the holder is made of a flexible, water-permeable, and water-retentive material.

12. The test fish handling equipment according to claim 9, wherein the posture maintaining groove is tapered toward a front end side.

13. The test fish handling equipment according to claim 9, further comprising:
water flow forming means for forming a water flow inside the pipe member by supplying the water to the supply port.

14. The test fish handling equipment according to claim 9, wherein a funnel-shaped funnel portion for guiding the test fish together with the water to the supply port is connected to the supply port.

15. The test fish handling equipment according to claim 9, further comprising:
a water receiver in which the handling portion is installed and which receives the water discharged from the discharge port.

16. A test fish handling method comprising:
using the test fish handling equipment according to claim
  9; and
administering a test substance to the test fish held by the
  holder as a predetermined handling.

17. The test fish handling method according to claim 16,
wherein as the predetermined handling, oral administra-
  tion is performed to directly and orally administer a test
  substance to the test fish through an oral tube inserted
  into an oral cavity of the test fish maintained in a
predetermined posture by the posture maintaining
  groove of the holder.

18. The test fish handling method according to claim 16,
wherein as the predetermined handling, parenteral admin-
  istration is performed to administer a test substance to
the test fish by injection into the test fish maintained in
  a predetermined posture by the posture maintaining
  groove of the holder.

19. The test fish handling equipment according to claim 9,
wherein a depth of the posture maintaining groove is set
to be greater than a height of the test fish held by the
  posture maintaining groove.

\* \* \* \* \*